United States Patent [19]
Deane et al.

[11] Patent Number: 5,819,588
[45] Date of Patent: Oct. 13, 1998

[54] METHOD AND A DEVICE FOR SETTING BACKLASH BETWEEN GEARS IN A GEAR TRAIN

[75] Inventors: Daniel Deane, Peterborough; David Mills, Beccles, both of United Kingdom

[73] Assignee: Perkins Limited, Cambridgeshire, United Kingdom

[21] Appl. No.: 720,858

[22] Filed: Oct. 3, 1996

[30] Foreign Application Priority Data

Oct. 3, 1995 [GB] United Kingdom ................ 95201149

[51] Int. Cl.⁶ .................................................. F16H 55/18
[52] U.S. Cl. ............................................ 74/409; 74/440
[58] Field of Search ...................................... 74/440, 409

[56] References Cited

U.S. PATENT DOCUMENTS

| | | | |
|---|---|---|---|
| 3,502,059 | 3/1970 | Davis et al. ............................. | 123/90 |
| 3,552,224 | 1/1971 | Dobrauz .................................. | 74/409 |
| 3,803,935 | 4/1974 | Nozawa ................................... | 74/409 |
| 4,241,619 | 12/1980 | Cerny et al. ........................... | 74/440 |
| 4,532,822 | 8/1985 | Godlewski ............................... | 74/397 |
| 4,747,321 | 5/1988 | Hannel .................................... | 74/440 |
| 5,685,197 | 11/1997 | Baker et al. ............................ | 74/409 |

FOREIGN PATENT DOCUMENTS

| | | |
|---|---|---|
| 1118775 | 7/1968 | United Kingdom . |
| 1416930 | 12/1975 | United Kingdom . |
| WO 93/00530 | 1/1993 | United Kingdom . |
| 2284460 | 6/1995 | United Kingdom . |

*Primary Examiner*—Charles A. Marmor
*Assistant Examiner*—David M. Fenstermacher
*Attorney, Agent, or Firm*—Nilles & Nilles SC

[57] ABSTRACT

A method and a device for setting backlash between gears in a gear train. The device comprises a gear device. When the gear device is located in a gear train with a drive gear and a driven gear and brought into mesh therewith, the drive and driven gears mountings can be fastened to secure the positions of said drive and driven gears. The gear device can then be removed and is replaced by an idler gear designed to mesh with the drive and driven gears with an amount of backlash with each predetermined by the gear device. The gear device may comprise a gear oversized by a preset amount. Alternatively, it may comprise a pair of rods pivotally secured together.

27 Claims, 2 Drawing Sheets

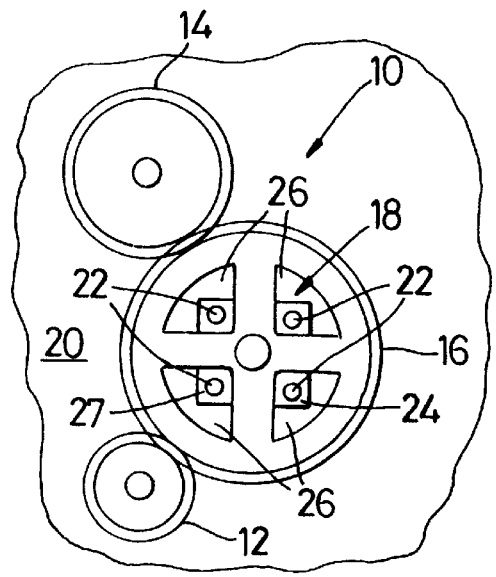
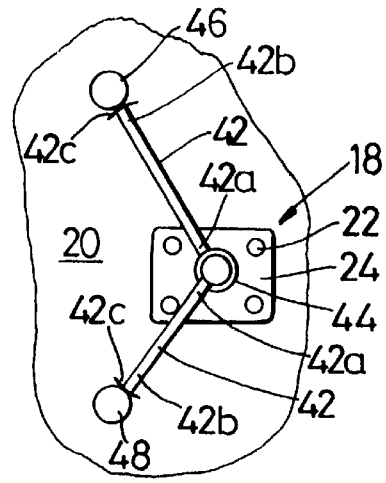
Fig. 1
Fig. 3
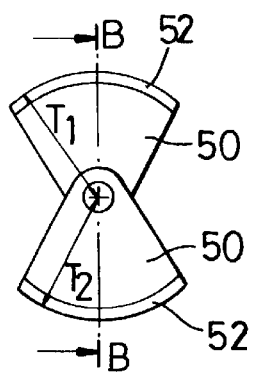
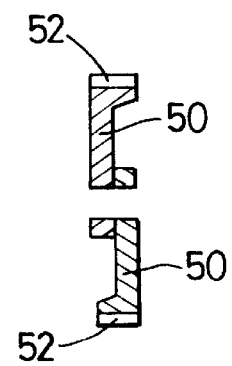
Fig. 4a
Fig. 4b

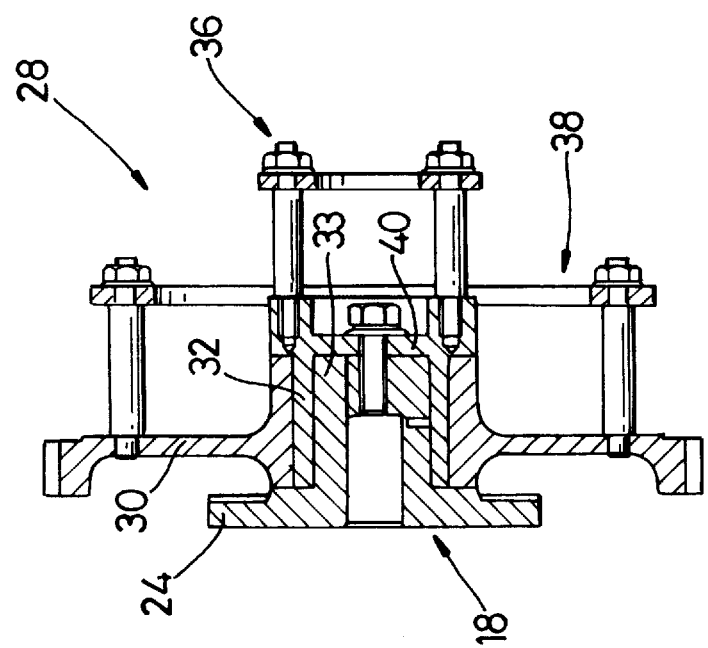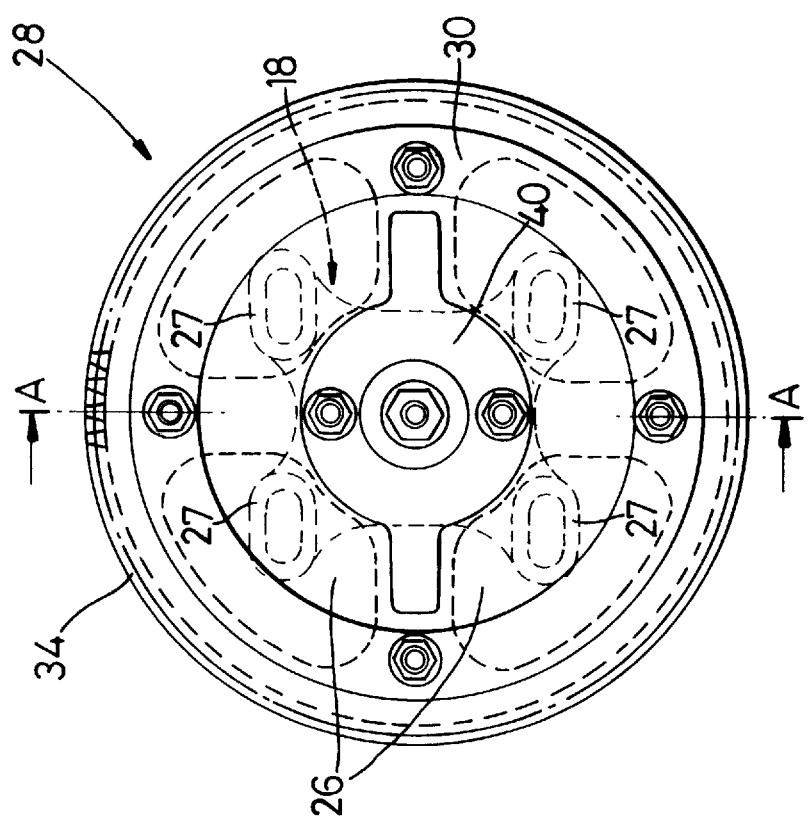

METHOD AND A DEVICE FOR SETTING BACKLASH BETWEEN GEARS IN A GEAR TRAIN

BACKGROUND OF THE INVENTION

The present invention relates to a method and a device for setting backlash between gears in a gear train. The present invention is particularly suited for use in the building and servicing of internal combustion (i.c.) engines having gear driven ancillary devices such as fuel injection pumps and water pumps, for example.

DISCUSSION OF THE RELATED ART

Gear trains are commonly employed in diesel fuelled i.c. engines where the load imposed by ancillary devices would otherwise require a heavy duty driving chain or belt. Normal machining and assembly tolerances can lead to a level of backlash between gears which may in turn lead to imprecise timing of fuel injection or other engine events having a deleterious effect on engine performance and exhaust gas emissions.

A further disadvantage of excessive backlash between gears in a gear train is the noise resulting from gear chatter, particularly where load on one or more gears in the gear train is variable or oscillating. Such gear chatter also leads to wear of gear teeth and, therefore, a worsening in any engine event timing or noise problems.

It should, however, be noted that, except where the gear teeth have a resilient structure designed to eliminate backlash such as that disclosed in applicant's pending United Kingdom application No. 9324968.8, published as GB 2284460A, predetermined amounts of backlash between gears are generally desirable to allow for gear out of roundness and other gear variations. Such predetermined amounts of backlash will also provide for displacement of gear positioning components from their ideal locations and will allow for in-use settlement of gaskets between components and thermal growth of gears and related components.

There may sometimes be cases where zero backlash is desired. However, the setting of an idler gear firmly in mesh with its associated gears in one rotational position of the gears can lead to unacceptable tooth loading in another rotational position of said gears. The device of the present invention in its various embodiments can be employed to set predetermined amounts of backlash between gears in a gear train in order to mitigate this and other problems.

The optimum amount of backlash may differ between an idler gear and each of two or more associated gears. For example, the bearing running clearance for a crankshaft may be greater than that for a camshaft. Therefore a larger amount of backlash may be needed between the idler gear and the crankshaft gear than that between the idler gear and the camshaft gear to avoid binding of meshed teeth under extremes of gear radial movement.

A means for adjusting gear backlash to compensate for in-service wear of gears is disclosed in international patent application No. PCT/U.S.92/04364, published as WO 93/00530, in which an idler gear is mounted on a positionable hub such that it can be moved into closer mesh with associated gears to compensate for wear. The adjusting means could be used to set the amounts of backlash between the idler gear and its associated gears, but it would require a skilled technician to measure and set the backlash amounts.

An apparatus is also known for measuring distances between gears in order that a suitable choice may be made from a range of closely related differently sized idler gears. This method of setting backlash by selecting a suitable idler gear size not only requires a skilled technician, but also necessitates the need for idler gears in a range of closely related sizes to be held in stock for each particular idler gear in an engine, for example.

OBJECTS AND SUMMARY OF THE INVENTION

It is an object of the present invention to provide a method and a device that will enable low skilled operatives to assemble gear trains on newly built or in-service engines while setting the amounts of backlash between the gears at their optimally determined levels to obviate or mitigate the aforesaid problems.

According to a first aspect of the present invention, there is provided a method of presetting predetermined amounts of backlash between, on the one hand, a drive gear and a driven gear of a gear train and, on the other hand, an idler gear mountable in the gear train to be meshed with the drive gear and the driven gear, comprising the steps of: locating a device on a positionable hub intended to mount the idler gear; abutting the device with the drive gear and the driven gear, or with hubs therefor, to set a position of the idler gear hub relative to a support surface; securing the idler gear hub to the surface at the set position; and replacing the device with the idler gear, the device being dimensioned to provide the predetermined amounts of backlash between the drive and driven gears and the idler gear.

The method may include the step of loosely securing the positionable hub to the support surface prior to locating the device on the positionable hub.

The method may include the step of removing the device, or a part thereof, from contact with the drive and driven gears, or the hubs therefor, in a generally radial direction of said gears after the idler gear hub has been secured at the set position.

According to a second aspect of the present invention, there is provided a device for use in the method of the present invention, wherein the device comprises a dummy idler gear of a size greater than an idler gear to be located in a gear train in meshing engagement with a drive gear and a driven gear of the gear train, the dummy idler gear being greater in size than the idler gear by a predetermined amount necessary for presetting the required amounts of backlash between, on the one hand, the drive gear and the driven gear and, on the other hand, the idler gear.

The dummy idler gear may include apertures to provide an operator with access to fixing points of the positionable idler gear hub.

The dummy idler gear may include teeth along portions of its periphery for meshing with teeth of the drive and driven gears. The dummy idler gear may include means to enable it, or a part thereof, to be removed from contact with the drive and driven gears in a generally radial direction of the drive and driven gears.

The dummy idler gear may comprise an assembly of a bush and a dummy idler gear flange slidably mounted on the bush, wherein the bush is mountable on the positionable idler gear hub and the bush includes means for extracting it from the dummy idler gear flange whereby, with the assembly mounted on the idler gear hub, after the bush is extracted from the dummy idler gear flange, the flange can be removed from contact with the drive and driven gears in a generally radial direction of the gears.

The dummy idler gear flange may be rotatably mounted on the bush.

The dummy idler gear flange may include means to enable it to be held in position whilst the bush is extracted therefrom.

The bush may include means to enable it to be secured to a stub axle of the idler gear hub.

According to a third aspect of the present invention there is provided a device for use in the method of the invention, wherein the device comprises two members. The members have means enabling them to be rotatably mounted on a positionable idler gear hub intended to mount an idler gear and each member has means for abutting a respective one of the drive and driven gears, or the hub therefor, each member being dimensioned to provide a predetermined required amount of backlash between the idler gear and a respective one of the drive and driven gears.

The members may each comprise rod means.

The means for mounting a member to the idler gear hub may comprise a bush located at one end thereof which, in use, locates over a stub axle of the idler gear hub.

The mounting means may include means to enable the member to be secured to said hub at a chosen rotational position with respect thereto.

The abutting means of each member may comprise a curved portion located at an opposite end of the member to the mounting means end.

The outer surface of the curved portion may be convex.

The curved portion preferably has a radius of curvature equal to the length of the member from the curved portion to a centre of rotation of the mounting means.

Alternatively, the curved portion is concave and preferably has a radius of curvature closely matching the radius of a respective one of the drive and driven gears, or the hub therefor.

The members may each be adjustable in an axial direction thus enabling the device to be used for presetting predetermined amounts of backlash between any idler gear and its associated gears.

The members may each be telescopically adjustable.

Alternatively, the members may each comprise a segment of a dummy idler gear.

The members may each be dimensioned such that the amount of backlash determined by each member with a respective one of the drive and driven gears is different than that determined by the other member.

The members may be pivotally connected to each other.

BRIEF DESCRIPTION OF THE DRAWINGS

The foregoing and further features of the present invention will be more readily understood from the following description of preferred embodiments thereof with reference to the following drawings, of which:

FIG. 1 is a front elevational view of a dummy idler gear in accordance with a first embodiment of the present invention mounted on a positionable idler gear hub in a gear train in place of an idler gear;

FIG. 2*a* is a front elevational view of a dummy idler gear assembly in accordance with a second embodiment of the present invention mounted on a positionable idler gear hub;

FIG. 2*b* is a cross-sectional view on line A—A of FIG. 2*a*;

FIG. 3 is a front elevational view of a device in accordance with a third embodiment of the present invention mounted on a positionable idler gear hub;

FIG. 4*a* is a front elevational view of a device in accordance with a fourth embodiment of the present invention; and FIG. 4*b* is a cross-sectional view on line B—B of FIG. 4*a*.

DETAILED DESCRIPTION OF THE PREFERRED EMBODIMENT

Referring to the drawings, FIG. 1 shows a front elevational view of a gear train 10 comprising a drive gear 12, a driven gear 14 and a dummy idler gear 16. The dummy idler gear 16 replaces, for the purpose of presetting backlash, an idler gear (not shown) intended to form part of the gear train 10. The dummy idler gear 16 has a size greater than that of the idler gear. The dummy idler gear 16 is, in use, mounted in meshing engagement with both the drive and driven gears (12,14), being mounted on a positionable hub 18 which is bolted to a support surface such as the face 20 of an i.c. engine. Prior to mounting the idler gear on the hub 18, the hub 18 is loosely secured to the face 20 of the engine. Then, the dummy idler gear 16 is located on the positionable hub and its position adjusted so that it is firmly in mesh with both the drive and driven gears (12,14). Thus, the position of the hub 18 is set and it can be secured at said position to the face 20 of the engine by bolts 22. The hub has a face plate 24 including over-sized holes, for example slots 27, through which the bolts 22 locate. The dummy idler gear 16 includes a number of apertures 26 allowing access to the hub face plate securing bolts 22.

Once the bolts 22 are tightened to secure the face plate 24 and thus the hub 18 to the engine face 20, the dummy idler gear is removed and replaced by the idler gear to complete the gear train 10.

The dummy idler gear 16 is dimensioned such that it presets predetermined required amounts of backlash between, on the one hand, the idler gear and, on the other hand, the drive and driven gears (12,14) of the gear train (10).

The dummy idler gear 16 may have teeth only on portions of its periphery necessary for meshing with the drive and driven gears (12,14). Alternatively, it may have teeth all around its periphery such that, when the idler gear hub 18 is secured at the set position, the dummy idler gear 16 can be rotated to check the drive and driven gears (12,14) for tight spots which might lead to false readings where the gears are used as a means of indicating or measuring rotational positions rather than as power transmission devices.

It will be appreciated that, for a given gear train, a dummy idler gear of predetermined over-size can be provided thus allowing a low skilled operative to construct the gear train with the required amounts of backlash between gears with no requirement on the part of the operative to calculate the position of the idler gear hub or to use tools such as feeler gauges in setting backlash.

In the context of the present invention "drive gear" is understood to include any gear forming a part of a gear train which imparts or transfers drive via an idler gear to any other (driven) gear of the gear train.

One problem encountered with the abovedescribed method is that the dummy idler gear 16 is removed from being firmly in mesh with the drive and driven gears 12 and 14 in a direction normal to the plane of the gears. Thus, there is a probability of wear to the teeth of both the dummy idler gear and the drive and driven gears as the dummy idler gear is slid out of meshing engagement with the drive and driven gears.

This problem can be overcome by modifying the dummy idler gear of the first embodiment of the invention in the manner illustrated in FIGS. 2*a* and 2*b* to provide a dummy idler gear assembly which, once the idler gear hub has been secured to the engine face at a set position, at least a part of the assembly can be removed from contact with drive and driven gears in a generally radial direction of said gears.

In the following description of a second and subsequent embodiments of the device in accordance with the present invention, like numerals will be used to denote like parts.

The device of the second embodiment of the invention consists of a dummy idler gear assembly 28 comprising a dummy idler gear flange 30 which can be slidably and rotatably mounted on a bush 32. The bush 32 is mountable on the idler gear hub 18. In use, the dummy idler gear flange 30 is mounted on the bush 32 and then the assembly is mounted by means of the bush 32 on a stub axle 33 of the positionable idler gear hub 18 which has been loosely secured to the engine face 20. In a similar manner to the method described with respect to the device of the first embodiment, the position of the assembly 28 is manually adjusted until a toothed periphery 34 of the dummy idler gear flange 30 is in firm mesh with the drive and driven gears (12,14). The hub 18 can then be secured to the engine face 20 by bolts 22 which are accessed via apertures 26 in the dummy idler gear flange 30.

The bush 32 has a first handle means 36, and the dummy idler gear flange 30 has a second handle means 38 which each extend outwardly from the plane of the flange 30. The second handle means 38 allows the flange 30 to be held in position relative to the drive and driven gears (12,14) whilst the bush 32 is extracted from the flange 30 and stub axle 33 of the hub 18 by means of the first handle means 36. Once the bush 32 has been fully extracted, it is possible to move the flange 30 in a generally radial direction of the drive and driven gears (12,14) to disengage the toothed periphery 34 from meshing engagement with said gears.

The bush 32 may be arranged such that it can, in use, be bolted through an end plate 40 to the stub axle 33 of the hub 18.

Thus, this embodiment of the device of the invention overcomes the problem associated with sliding a dummy idler gear axially out of firm mesh with the drive and driven gears.

By using a dummy idler gear or dummy idler gear assembly as described above, it is only readily possible to set equal amounts of backlash between, on the one hand, an idler gear and, on the other hand, drive and driven gears.

FIG. 3 shows a front elevational view of a third embodiment of the device in accordance with the present invention. The device of this embodiment is capable of allowing a low skilled operative to set different amounts of backlash between an idler gear and each of its associated gears.

The device consists of two arms 42, each having one end 42*a* formed with a bush 44 enabling it to be mounted on the idler gear hub 18, a rotational position of each arm 42 relative to the hub 18 being independently adjustable. When each arm is respectively positioned with an outer end 42*b* thereof in contact with a respective one of the hubs (46,48) for the drive or driven gears (12,14), the idler gear hub 18 is set at a position which will provide the desired amounts of backlash between the idler gear, on the one hand, and the drive and driven gears (12,14), on the other hand. The amounts of backlash can be preset to be equal but the advantage of this embodiment over the aforementioned embodiments is that different predetermined amounts of backlash can be preset.

The outer end 42*b* of each arm 42 is preferably formed with a convex curved portion 42*c* which has a radius of curvature equal to a length of the arm 42 from the curved portion 42*c* to a centre of rotation of the bush 44 located at the other end of the arm 42. The bush 44 preferably includes means (not shown) to enable the arm 42 to be secured at a chosen rotational position with respect to the hub 18. Thus, an operative can place each arm 42 in turn on the loosely secured hub 18 and secure it at a rotational position generally corresponding to a rotational position of a hub (46,48) for a respective one of said drive and driven gears (12,14). Since the curved portion 42*c* of each arm 42 has a radius of curvature as aforementioned and the curved portion 42*c* has a width greater than that of the arm 42, then, provided the arms 42 with the hub 18 now secured thereto are adjusted such that the curved portions 42*c* are maintained in contact with their respective hubs (46,48), the operative need not make any further adjustment of the rotational positions of the arms 42 relative to the hub 18 and a set position for the hub 18 supported by the arms 42 can be readily obtained.

In a not shown embodiment of the invention, the arms 42 are telescopically adjustable. Consequently, it is possible for an operative to use this embodiment of the device for presetting backlash between any idler gear and its associated gears. The operative need only be informed of the respective axial lengths of each arm for a respective idler gear of a gear train. The arms of the device may also be pivotally connected together and the curved portions may be concave preferably as a radius of curvature closely matching the radius of a respective one of said drive and driven gear hubs (46,48).

Alternatively, the arms of the device can be replaced by segments 50 of a dummy idler gear as shown in FIGS. 4*a* and 4*b*. The peripheral edges 52 of the segments 50 include teeth for meshing with teeth of said drive and driven gears (12,14). The radii (r1,r2) of the segments 50 can be chosen to provide a respective predetermined amount of backlash between the idler gear and a respective one of said drive and driven gears (12,14). The segments are pivoted to each other.

The method of presetting backlash using this embodiment of the device of the present invention generally follows the methods hereinbefore described with respect to the other embodiments of the invention.

All of the embodiments of the invention allow an operative to quickly and accurately preset predetermined amounts of backlash in a gear train of an i.c. engine under construction or being serviced.

We claim:

1. A method of presetting predetermined amounts of backlash between gears of a gear train, said gear train including 1) a drive gear, 2) a driven gear, an idler gear which meshes with said drive gear and said driven gear, and 3) an idler gear hub a) mountable on a support surface, b) being selectively movable relative to said support surface, and c) being capable of mounting said idler gear, said method comprising the steps of:

providing a backlash setting device;

locating said backlash setting device on said idler gear hub;

moving said idler gear hub and said backlash setting device in a backlash setting direction relative to said support surface so that said backlash setting device abuts at least one of said drive gear and said driven gear so as to produce a set position of said idler gear hub relative to said support surface;

securing said idler gear hub to said support surface at said set position so as to prevent additional relative movement therebetween in said backlash setting direction; and replacing said backlash setting device with said idler gear so that said idler gear is mounted on said idler gear hub at a location in which said idler gear meshes with said drive gear and said driven gear, wherein said backlash setting device is dimensioned such that, when said idler gear hub is in said set position and said idler gear is mounted on said idler gear hub, predetermined amounts of backlash exist between said idler gear and said drive gear and between said idler gear and said driven gear.

2. A method as claimed in claim 1, further comprising loosely securing said idler gear hub to said support surface prior to locating said backlash setting device on said idler gear hub.

3. A method as claimed in claim 1, wherein the replacing step includes removing at least part of said backlash setting device from contact with said at least one of said drive gear and said driven gear, the removing step comprising moving said at least one part of said backlash setting device radially relative to axes of said drive gear and said driven gear so as to move said backlash setting device out of abutment with said at least one of said drive gear and said driven gear after said idler gear hub has been secured in said set position.

4. A method as claimed in claim 1, wherein the providing step comprises providing a dummy idler gear of a size greater than said idler gear by a predetermined amount necessary for presetting the required amounts of backlash between said idler gear and said drive gear and between said idler gear and said driven gear.

5. A method as claimed in claim 4, wherein the providing step comprises providing a dummy idler gear which includes apertures which provide an operator with access to fixing points of said idler gear hub at which said idler gear hub is secured to said support surface.

6. A method as claimed in claim 4, wherein the providing step comprises providing a dummy idler gear which includes teeth along at least portions of its periphery for meshing with teeth of said drive gear and said driven gear.

7. A method as claimed in claim 4, wherein the providing step comprises providing a dummy idler gear which includes means for enabling at least part of said dummy idler gear to be removed from contact with said at least one of said drive gear and said driven gear in a generally radial direction of said drive gear and said driven gear.

8. A method as claimed in claim 4, wherein the providing step comprises providing a dummy idler gear which comprises an assembly of a bush and a dummy idler gear flange slidably mounted on said bush, wherein said bush is mountable on said idler gear hub and said bush includes means for extracting said bush from said dummy idler gear flange whereby, with said assembly mounted on said idler gear hub, after said bush is extracted from said dummy idler gear flange, said flange can be removed from contact with said at least one of said drive gear and said and driven gear in a generally radial direction of said gears.

9. A method as claimed in claim 8, wherein the providing step comprises providing a dummy idler gear flange which is rotatably mounted on said bush.

10. A method as claimed in claim 9, wherein said dummy idler gear flange includes means for enabling said dummy idler gear flange to be held in position whilst said bush is extracted therefrom.

11. A method as claimed in claim 8, wherein said bush includes means for enabling said bush to be secured to a stub axle of said idler gear hub.

12. A method as claimed in claim 1, wherein the providing step comprises providing a backlash setting device which comprises two members, said members having mounting means for enabling said members to be rotatably mounted on said idler gear hub, wherein each said member has abutting means for abutting a respective one of said drive gear and said driven gears, each said member being dimensioned to provide a predetermined required amount of backlash between said idler gear and a respective one of said drive gear and said driven gear.

13. A method as claimed in claim 12, wherein said members each comprise a rod.

14. A method as claimed in claim 12, wherein said mounting means comprises a bush which is located at one end of said member and which, in use, locates over a stub axle of said idler gear hub.

15. A method as claimed in claim 12, wherein said mounting means includes means for enabling each said member to be secured to said idler gear hub at a chosen rotational position with respect thereto.

16. A method as claimed in claim 12, wherein said abutting means of each member comprises a curved portion located at an opposite end of said member to said mounting means.

17. A method as claimed in claim 16, wherein an outer surface of said curved portion is convex.

18. A method as claimed in claim 16, wherein said curved portion has a radius of curvature equal to a length of said member from said curved portion to a center of rotation of said mounting means.

19. A method as claimed in claim 16, wherein said curved portion is concave and has a radius of curvature closely matching a radius of a respective one of said drive gear and said driven gear.

20. A method as claimed in claim 12, wherein said members are each adjustable in an axial direction thus enabling said backlash setting device to be used for presetting predetermined amounts of backlash between any idler gear and said drive gear and said driven gear.

21. A method as claimed in claim 12, wherein said members are each dimensioned such that the amount of backlash determined by each said member with a respective one of said drive gear and said driven gear is different than that determined by the other member.

22. A method as claimed in claim 12, wherein said members are pivotally connected to each other.

23. A gear train comprising:

a support surface;

a drive gear rotatably mounted on said support surface and having a first rotational axis;

a driven gear rotatably mounted on said support surface and having a second rotational axis;

an idler gear hub which is adjustably mounted on said support surface so as to be selectively 1) movable in a backlash setting direction relative to said support surface and 2) fixed from movement in said backlash setting direction relative to said support surface, wherein said backlash setting direction is perpendicular to said first and second rotational axes;

a backlash setting device which is removably mountable on said idler gear hub so as to be movable with said idler gear hub in said backlash setting direction to a position in which said backlash setting device abuts at least one of said drive gear and said driven gear and so as to produce a set position of said idler gear hub relative to said support surface, wherein said idler gear hub is securable to said support surface at said set position so as to prevent additional relative movement therebetween in said backlash setting direction; and an idler gear which is mountable on said idler gear hub and which replaces said backlash setting device so as to mesh with said drive gear and said driven gear, wherein said backlash setting device and said idler gear are dimensioned relative to one another so that predetermined amounts of backlash exist between said idler gear and said drive gear and between said idler gear and said driven gear when said idler gear hub is secured in said set position.

24. A gear train as claimed in claim 23, wherein said backlash setting device comprises a dummy idler gear of a size greater than said idler gear by a predetermined amount necessary for presetting the required amounts of backlash between said idler gear and said drive gear and between said idler gear and said driven gear.

25. A gear train as claimed in claim 24, wherein said dummy idler gear includes apertures configured to provide an operator with access to fixing points of said idler gear hub at which said idler gear hub is secured to said support surface.

26. A gear train as claimed in claim 23, wherein said backlash setting device comprises a dummy idler gear which comprises an assembly of a bush and a dummy idler gear flange slidably mounted on said bush, wherein said bush is mountable on said idler gear hub and said bush includes means for extracting said bush from said dummy idler gear flange whereby, with said assembly mounted on said idler gear hub, and after said bush is extracted from said dummy idler gear flange, said flange can be removed from contact with said at least one of said drive gear and said and driven gear in a generally radial direction of said gears.

27. A gear train as claimed in claim 23, wherein said backlash setting device comprises two members, said members having mounting means for enabling said members to be rotatably mounted on said idler gear hub, and wherein each said member has abutting means for abutting a respective one of said drive gear and said driven gear, each said member being dimensioned to provide a predetermined amount of backlash between said idler gear and a respective one of said drive gear and said driven gear.

* * * * *